United States Patent
Olds

(10) Patent No.: US 10,575,054 B2
(45) Date of Patent: *Feb. 25, 2020

(54) SYSTEMS AND METHODS FOR IDENTIFYING NON-CANONICAL SESSIONS

(71) Applicant: Google LLC, Mountain View, CA (US)

(72) Inventor: Timothy Olds, New York, NY (US)

(73) Assignee: GOOGLE LLC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,445

(22) Filed: Dec. 13, 2017

(65) Prior Publication Data
US 2018/0103293 A1 Apr. 12, 2018

Related U.S. Application Data

(63) Continuation of application No. 15/075,895, filed on Mar. 21, 2016, now Pat. No. 9,872,072.

(51) Int. Cl.
H04N 21/458 (2011.01)
G06F 16/93 (2019.01)
(Continued)

(52) U.S. Cl.
CPC ....... *H04N 21/458* (2013.01); *G06F 16/9535* (2019.01); *G06F 21/00* (2013.01);
(Continued)

(58) Field of Classification Search
CPC ............. H04N 21/4532; H04N 21/458; H04N 21/2668; H04N 21/466; H04N 21/4444
See application file for complete search history.

(56) References Cited

U.S. PATENT DOCUMENTS 6,460,036 B1 * 10/2002 Herz ................. G06F 17/30867
348/E7.056
6,530,082 B1 3/2003 Del Sesto et al.
(Continued)

FOREIGN PATENT DOCUMENTS

CN 103530543 1/2014
JP 2006-524009 10/2006
(Continued)

OTHER PUBLICATIONS

"Walmart and Google to offer voice-enabled shopping", BBC News, Aug. 23, 2017 (10 pages).
(Continued)

*Primary Examiner* — Brian T Pendleton
*Assistant Examiner* — Frank Johnson
(74) *Attorney, Agent, or Firm* — Foley & Lardner LLP; James De Vellis

(57) ABSTRACT

Non-canonical user sessions can be identified. Demographics associated with a device identifier can be compared with demographics associated with requested content (e.g. video, website, etc.). If the demographics match above a threshold, then the session may be assumed to be canonical or associated with the original user. If the demographics of the content do not match the demographics of the user, then the session may be considered non-canonical. Upon identifying a non-canonical session, content selection based on demographics may be suspended until a timer expires or the session ends.

18 Claims, 6 Drawing Sheets

(51) Int. Cl.

| | |
|---|---|
| *G06F 16/9535* | (2019.01) |
| *G06F 21/00* | (2013.01) |
| *H04L 29/08* | (2006.01) |
| *G06F 21/62* | (2013.01) |
| *H04N 21/258* | (2011.01) |
| *H04N 21/45* | (2011.01) |
| *H04L 29/06* | (2006.01) |

(52) U.S. Cl.
CPC ........ *G06F 21/6218* (2013.01); *H04L 67/143* (2013.01); *H04L 67/306* (2013.01); *H04N 21/25883* (2013.01); *H04N 21/4532* (2013.01); *G06F 2221/2149* (2013.01); *H04L 63/08* (2013.01); *H04L 67/02* (2013.01)

(56) References Cited

U.S. PATENT DOCUMENTS

| | | | |
|---|---|---|---|
| 6,684,194 | B1 | 1/2004 | Eldering et al. |
| 7,150,030 | B1 | 12/2006 | Eldering et al. |
| 7,260,823 | B2 | 8/2007 | Schlack et al. |
| 7,260,837 | B2 | 8/2007 | Abraham et al. |
| 7,698,236 | B2 | 4/2010 | Cox et al. |
| 7,707,599 | B1* | 4/2010 | Groff ................ H04N 7/165 715/700 |
| 7,930,285 | B2 | 4/2011 | Abraham et al. |
| 8,046,798 | B1 | 10/2011 | Schlack et al. |
| 8,108,517 | B2 | 1/2012 | Kalavade |
| 8,239,886 | B2 | 8/2012 | Savoor et al. |
| 8,307,006 | B2 | 11/2012 | Hannan et al. |
| 8,365,213 | B1 | 1/2013 | Orlowski |
| 8,429,266 | B2 | 4/2013 | Vanheuverzwyn |
| 8,448,057 | B1 | 5/2013 | Sugnet et al. |
| 8,539,520 | B2 | 9/2013 | Falcon |
| 8,549,103 | B2 | 10/2013 | Bhatia et al. |
| 8,739,197 | B1 | 5/2014 | Pecjak et al. |
| 8,910,195 | B1 | 12/2014 | Barney et al. |
| 8,924,993 | B1 | 12/2014 | Niebles Duque et al. |
| 9,003,441 | B1 | 4/2015 | Jindal et al. |
| 9,118,542 | B2 | 8/2015 | Srivastava et al. |
| 9,185,095 | B1 | 11/2015 | Moritz et al. |
| 9,332,284 | B1* | 5/2016 | Taylor ............... H04N 21/488 |
| 2003/0051240 | A1* | 3/2003 | Schaffer ............ H04N 7/17318 725/34 |
| 2003/0056208 | A1 | 3/2003 | Kamada et al. |
| 2003/0083938 | A1* | 5/2003 | Smith .................... G06Q 30/02 705/14.53 |
| 2003/0115586 | A1 | 6/2003 | Lejouan et al. |
| 2007/0271580 | A1* | 11/2007 | Tischer ................ H04H 60/07 725/35 |
| 2008/0059390 | A1* | 3/2008 | Cox ..................... G06Q 30/02 706/12 |
| 2008/0263578 | A1 | 10/2008 | Bayer et al. |
| 2009/0100459 | A1 | 4/2009 | Riedl et al. |
| 2009/0138805 | A1* | 5/2009 | Hildreth ............. G06K 9/00335 715/745 |
| 2009/0328209 | A1 | 12/2009 | Nachenberg |
| 2010/0100618 | A1* | 4/2010 | Kuhlke ................ H04L 43/00 709/224 |
| 2010/0211884 | A1* | 8/2010 | Kashyap ............... H04N 7/163 715/745 |
| 2011/0016482 | A1 | 1/2011 | Tidwell et al. |
| 2011/0087519 | A1 | 4/2011 | Fordyce et al. |
| 2012/0063649 | A1* | 3/2012 | Pettit ................... G06F 16/435 382/118 |
| 2012/0149417 | A1 | 6/2012 | Akhtar |
| 2012/0260284 | A1* | 10/2012 | Young ................ H04N 21/4314 725/37 |
| 2012/0290648 | A1* | 11/2012 | Sharkey .............. H04L 67/306 709/204 |
| 2013/0013737 | A1 | 1/2013 | Rehiman et al. |
| 2013/0014136 | A1 | 1/2013 | Bhatia et al. |
| 2013/0014137 | A1 | 1/2013 | Bhatia et al. |
| 2013/0018719 | A1 | 1/2013 | Abraham et al. |
| 2013/0024879 | A1 | 1/2013 | Bruich et al. |
| 2013/0035979 | A1 | 2/2013 | Tenbrock |
| 2013/0132989 | A1 | 5/2013 | Han et al. |
| 2013/0185750 | A1 | 7/2013 | Ayoub |
| 2013/0198125 | A1 | 8/2013 | Oliver et al. |
| 2013/0254787 | A1 | 9/2013 | Cox et al. |
| 2013/0268623 | A1 | 10/2013 | Besehanic et al. |
| 2013/0318193 | A1 | 11/2013 | Koli et al. |
| 2013/0332604 | A1 | 12/2013 | Seth et al. |
| 2014/0007147 | A1 | 1/2014 | Anderson |
| 2014/0013343 | A1 | 1/2014 | Bovenschulte et al. |
| 2015/0026181 | A1 | 1/2015 | Milton et al. |
| 2015/0181267 | A1 | 6/2015 | Morales et al. |
| 2015/0262201 | A1* | 9/2015 | Rao ................... G06Q 30/0201 705/7.29 |
| 2015/0373529 | A1* | 12/2015 | Scarr ..................... H04W 4/02 455/414.1 |
| 2017/0064405 | A1* | 3/2017 | Einaudi .............. H04N 21/4826 |
| 2017/0092278 | A1 | 3/2017 | Evermann et al. |
| 2017/0110130 | A1 | 4/2017 | Sharifi et al. |
| 2017/0110144 | A1 | 4/2017 | Sharifi et al. |
| 2017/0118515 | A1* | 4/2017 | Dey ................... H04N 21/4415 |
| 2017/0132019 | A1 | 5/2017 | Karashchuk et al. |
| 2017/0358301 | A1 | 12/2017 | Raitio et al. |
| 2018/0227631 | A1* | 8/2018 | Singh ............... H04N 21/44218 |

FOREIGN PATENT DOCUMENTS

| | | |
|---|---|---|
| JP | 2011-508319 | 7/2009 |
| WO | WO-00/54201 A2 | 9/2000 |
| WO | WO-2013/039538 A1 | 1/2014 |

OTHER PUBLICATIONS

Abrams, Help users find, interact & re-engage with your app on the Google Assistant, Google Developers Blog, Nov. 15, 2017, 16 pages.

Albrecht, "Alexa, How Can You Be Used in Restaurants?", the spoon, Dec. 10, 2017, 6 pages.

Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).

Barr, "AWS DeepLens—Get Hands-On Experience with Deep Learning With Our New Video Camera", AWS News Blog, Nov. 29, 2017, 11 pages.

Broussard, Mitchel, "Chatbot-Like Siri Patent Includes Intelligent Image, Video, and Audio Recognition within Messages", MacRumors, May 11, 2017 (7 pages).

Buckland et al., "Amazon's Alexa Takes Open-Source Route to Beat Google Into Cars", Bloomberg, Feb. 27, 2018, 6 pages.

Canadian Office Action for Appl. Ser. No. 2,939,364 dated Jun. 13, 2017 (4 pages).

Canadian Office Action for Appl. Ser. No. 2,939,364 dated May 10, 2018 (4 pages).

Chen, Lulu Yilun, "Alibaba Challenges Google, Amazon With New Echo-Like Device", Bloomberg Technology, Jul. 5, 2017 (3 pages).

Chinese Office Action for Appl. Ser. No. 201480076035.1 dated Mar. 22, 2018 (12 pages).

Clover, Juli, "Amazon and Google Want to Turn Their Smart Home Speakers Into Telephone Replacements", MacRumors, Feb. 15, 2017 (5 pages).

Coberly, "Apple patent filing reveals potential whispering Siri functionality", Techspot, Dec. 14, 2017, 4 pages.

Collins, et al., "Can Twitter Save Itself?", cnet, Apr. 26, 2017, reprinted from https://www.cnet.com/news/twitter-q1-2017-earnings/ on Aug. 22, 2017 (2 pages).

Crist, Ry, "Logitech Harmony's Alexa Skill just got a whole lot better", cnet, Jul. 13, 2017 (2 pages).

EPO Office Action for Appl. Ser. No. 14724273.9 dated May 2, 2018 (7 pages).

EPO Office Action for Appl. Ser. No. 14724273.9 dated Sep. 13, 2017 (10 pages).

(56) References Cited

OTHER PUBLICATIONS

Estes, "Amazon's Newest Gadget is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 (4 pages).
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, et al., "Apple is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
International Preliminary Report on Patentability for PCT Appl. Ser. No. PCT/US2017/023068 dated Jun. 6, 2018 (26 pages).
International Search Report and Written Opinion for PCT Appl. Ser. No. PCT/US2014/033648 dated Sep. 5, 2014 (10 pages).
International Search Report and Written Opinion for PCT Appl. Ser. No. PCT/US2017/023068, dated Jun. 21, 2017 (16 pages).
Japanese Office Action for Appl. Ser. No. 2016-553428 dated Jan. 4, 2017 (10 pages).
Japanese Office Action for Appl. Ser. No. 2016-553428 dated Jun. 26, 2017 (9 pages).
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Korean Office Action for Appl. Ser. No. 10-2016-7024404 dated Sep. 21, 2017 (8 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Lee, Take Two for Samsung's troubled Bixby assistant, BBC News, Oct. 19, 2017, 6 pages.

Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Nieva, Richard, "Google Home and eBay can tell you how much that's worth", cnet, Mar. 8, 2017 (3 pages).
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges at 'Silicon Beach'", Law360, Los Angeles, California, Feb. 2, 2017 (4 pages).
Unknown Author, "'Dolphin' attacks fool Amazon, Google voice assistants", BBC News, Sep. 7, 2017, 8 pages.
U.S. Notice of Allowance for U.S. Appl. No. 14/527,481 dated Dec. 7, 2015 (8 pages).
U.S. Notice of Allowance for U.S. Appl. No. 15/075,895 dated Sep. 15, 2017 (13 pages).
U.S. Notice of Allowance for U.S. Appl. No. 14/185,534 dated Oct. 20, 2014 (13 pages).
U.S. Office Action for U.S. Appl. No. 15/075,895 dated Feb. 28, 2017 (17 pages).
U.S. Office Action for U.S. Appl. No. 14/527,481 dated Aug. 21, 2015 (10 pages).
Willens, Max, "For publishers, Amazon Alexa holds promise but not much money (yet)", Digiday, Jul. 6, 2017 (6 pages).
Zhang, et al, "Detecting Insider Threat Based on Document Access Behavior Analysis in Network and Parallel Computing," vol. 8710, pp. 376-387, Sep. 5, 2014.
Examination Report Received for CA Application No. 2939364, Google LLC, dated Apr. 15, 2019, 4 pages.
Foreign Action other than Search Report on EP 19176428.1, dated Jul. 11, 2019, 10 pages.

* cited by examiner

SYSTEMS AND METHODS FOR IDENTIFYING NON-CANONICAL SESSIONS

RELATED APPLICATIONS

This application claims the benefit of and priority under 35 U.S.C. § 120 as a continuation to U.S. patent application Ser. No. 15/075,895, titled "Systems and Methods for Identifying Non-Canonical Sessions," filed Mar. 21, 2016, the entirety of which is hereby incorporated by reference.

BACKGROUND

Content may be selected and delivered to users based on user demographics, allowing advertisers and content providers to provide content that users may be most interested in. While users may be explicitly identified in some instances, in many implementations, users may be implicitly identified as associated with a device or application session. When correct, such application sessions may be referred to as canonical or conforming to the association between user and session. However, the implicit identifications may be incorrect, particularly in instances where users loan devices to each other. Such sessions may be referred to as non-canonical or non-conforming. Content may be mis-selected in such instances, or selected for the wrong user.

SUMMARY

User devices, such as smart phones, tablets, or desktop computers, are frequently associated with a single device identifier or cookie. The device identifier or cookie is used to represent the user operating the device, and may be associated with demographic data of the user, obtained either explicitly via user profiles or implicitly via search and browsing habits. During canonical sessions, content such as ads may be selected for presentation based on the demographics of the user associated with the device identifier or cookie.

However, in many instances, users share a device, and other users of the device may have radically different demographics (and correspondingly, content preferences). For example, a friend may allow another to use their laptop or tablet to view a video. Such non-canonical browsing sessions they should not be linked with the original user and demographics associated with the device identifier.

To automatically identify non-canonical sessions, in one implementation, demographics associated with the device identifier can be compared with demographics associated with the viewed content (e.g. video, website, etc.). If the demographics match above a threshold, then the session may be assumed to be canonical or associated with the original user. If the demographics of the content do not match the demographics of the user, then the session may be considered non-canonical. Upon identifying a non-canonical session, content selection based on demographics may be suspended until a timer expires or the session ends. Content providers, such as advertisers, may be charged reduced rates for randomly selected advertising in many implementations.

These implementations are mentioned not to limit or define the scope of the disclosure, but to aid in understanding it. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Media or other content may be provided to client devices, including desktop computers, laptop computers, tablets or smart phones, video game consoles, smart televisions, wearable computers, or any other type and form of client device capable of presenting content to a user. The content may be of any type and form, including text, audio, video, interactive applications, games, or other media. In many implementations, content may be created by publishers, generally referred to as content providers; and may be delivered to client devices by content distribution systems having infrastructure and bandwidth for delivering the content to thousands or millions of client devices simultaneously.

Content may be associated with or selected for various demographic groups, which may reflect both demographics such as age, gender, or location, as well as interests (e.g. finance, sports, etc.). Requests for content may include a device identifier or a selection of content may be based on a device identifier associated with a user having various demographics. In canonical sessions in which the client device is operated on behalf of the user associated with the device identifier and demographics, content may be selected appropriately. However, in non-canonical sessions, such as when the device is operated on behalf of another user, if content is selected based on the device identifier and associated demographics, content may be mis-selected, resulting in less user interest, lower click-through rates, fewer ad conversions, etc.

Figure 1:
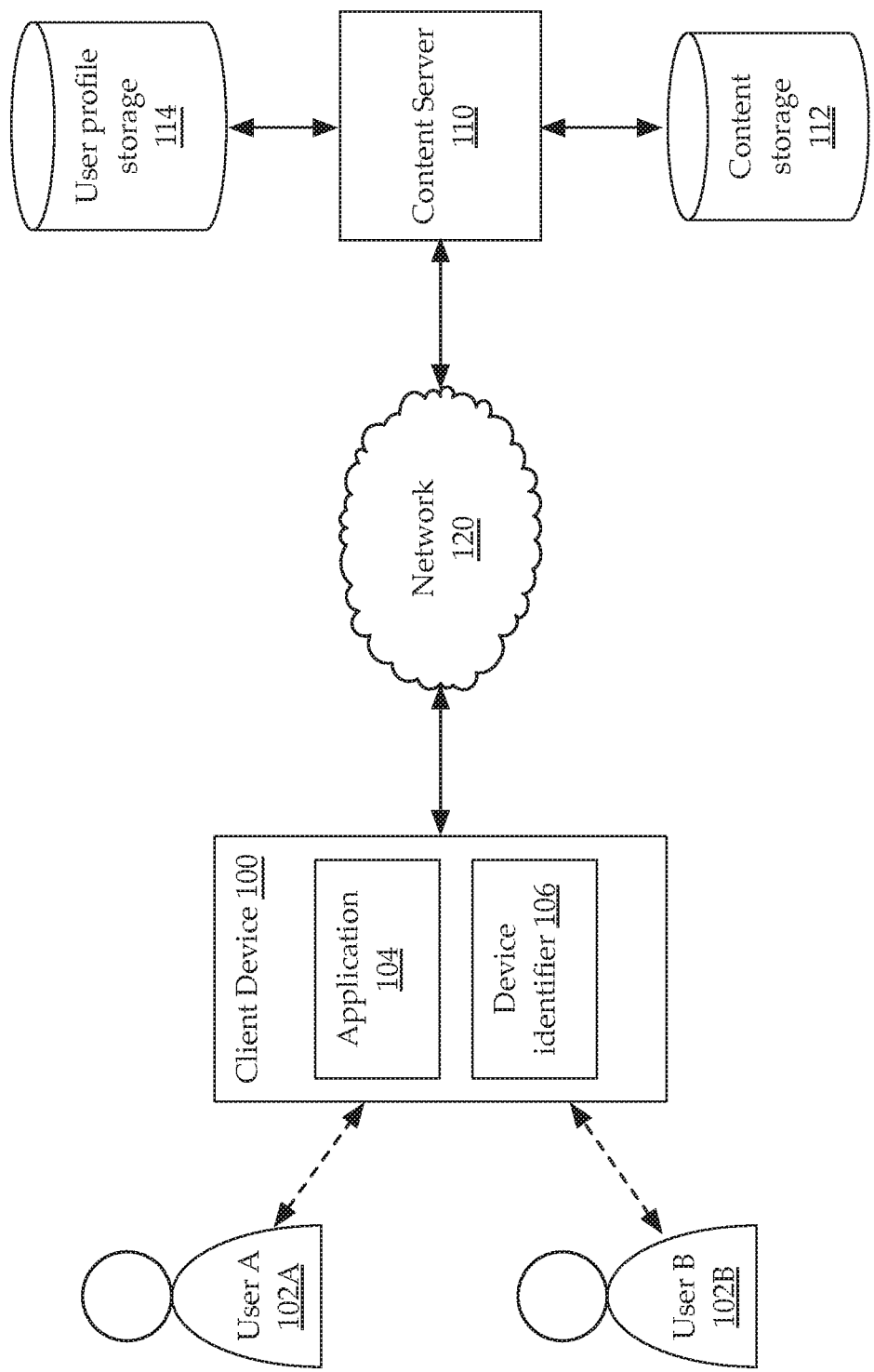
FIG. 1 is an illustration of an implementation of a system for content delivery to a client device used by multiple users.

For example, referring to FIG. 1, illustrated is an implementation of a system for content delivery to a client device used by multiple users 102A-102B (referred to generally as user(s) 102). A client device 100, such as a laptop computing device, desktop computing device, tablet computing device, smartphone, wearable computing device, set top box, smart television, video game console, or any other such device, may be typically used by or operated on behalf of a primary user 102A.

Client device 100 may operate an application 104, such as a media application, web browser, game, or any other type and form of application. In many implementations, application 104 may display content, such as text, audio, video, images, and/or interactive content such as web pages, games, or other content. Application 104 may display both content requested by a user 102 of the device, as well as content selected by a content server or provider and delivered to the device (e.g. banner, pre-roll, post-roll, or interstitial advertising; featured or recommended content; or any other type and form of content). For example, in one such implementation, application 104 may be a media player playing user-requested or selected content, as well as interstitial advertising.

Client device 100 may be associated with or comprise a device identifier 106. Device identifier 106 may be an alphanumeric string, data string, serial number, media access control (MAC) address, internet protocol (IP) address, username or account name, globally unique identifier (GUID), cookie, random or pseudorandom number, or any other type and form of identifier, including combinations of these or other identifiers. In some implementations, the device identifier 106 may be fixed to the device or preconfigured in the device, such as a manufacturer serial number or MAC address, while in other implementations, the device identifier 106 may be dynamically set by a content provider, audience measurement server, application 104, or other entity, such as a cookie or username. In some implementations, a unique or new device identifier 106 may be set for each communication to a content provider, while in other implementations, the device identifier 106 may not be changed, or may be changed periodically (e.g. hourly, daily, weekly, etc.) or at other intervals (e.g. on restart of the client device, login to an internet service, etc.). In some implementations, a device identifier 106 may be associated with one or more other device identifiers 106 (e.g., a device identifier for a mobile device, a device identifier for a home computer, etc.). In many implementations, a device identifier 106 may be generated and/or transmitted to the device 100 by a content provider. In other implementations, a client device 100 may request a device identifier or cookie 106 from a content provider, and may transmit the device identifier or cookie 106 to the content provider in association with requests for content.

As discussed above, device identifier 106 may be associated with a specific user 102, such as user A 102A. In some such implementations, device identifier 106 may comprise a user login or other user-specific identifier. In other implementations, device identifier 106 may be device-specific but associated with a user-specific identifier in a database or user profile storage 114 maintained by a content server 110 or other such entity.

As discussed above, a client device 100 may request content of and/or receive content from a content server 110. A content server or provider 110 may include one or more computing devices connected to network 120 and configured for providing content to a client 100, either directly or via another content distribution system. Content provider 110 may be referred to variously as a content provider, server, web server, data server, publisher, service provider, or by other similar terms. In many implementations, content provider 110 may include a plurality of computing devices configured as a server farm or cloud, and may include routers, load balancers, network address translators, firewalls, or other such devices. Content providers 110 may be computer servers (e.g., FTP servers, file sharing servers, web servers, etc.) or combinations of servers (e.g., data centers, cloud computing platforms, etc.). Content providers 110 may provide any type and form of content, including text, images, video, audio, multimedia, or other data, or any combination of these. Content may include search results, blog or forum content, news articles, movies, television shows, podcasts, video games or other interactive content, advertising in any format, websites, social media, or any other type and form of content. Content provider 110 may be an online search engine that provides search result data to client device 100 in response to a search query. In another implementation, content provider 110 may be a first-party web server that provides webpage data to client device 100 in response to a request for the webpage. Content server 110 may be referred to as a content delivery system (CDS) or content management system (CMS).

Client device 100 may communicate with content server 110 via a network 120. Network 120 may be any form of computer network or combinations of networks that relay information between client devices 100 and one or more content servers 110, as well as other devices not illustrated. Network 120 may include the Internet and/or other types of data networks, such as a local area network (LAN), a wide area network (WAN), a cellular network, satellite network, or other types of data networks. Network 120 may also include any number of computing devices (e.g., computer, servers, routers, network switches, etc.) that are configured to receive and/or transmit data within network 120. Network 120 may further include any number of hardwired and/or wireless connections. A client device 100 may communicate wirelessly (e.g., via WiFi, cellular, radio, etc.) with a transceiver that is hardwired (e.g., via a fiber optic cable, a CAT5 cable, etc.) to other computing devices in network 120. In some implementations, a network 120 may be a virtual network, such as a virtual network between a plurality of virtual machines executed by a single physical machine, or a abstract network such as an offline transfer of data via physically movable media (e.g. a Sneakernet, transferring data via tape media, CD-ROM, flash media, external hard drives, floppy disks, etc.).

Content server 110 may communicate with or maintain a user profile storage 114. User profile storage 114 may comprise one or more databases, tables, large data arrays, or other structures for storing device identifiers 106, demographic information about a user 102A associated with each device identifier 106, and other such information.

In many implementations, user profile storage 114 may store associations between multiple device identifiers 106 associated with a common user 102A. Demographic data stored in a user profile storage 114 may be of any type and form, including alphanumeric strings or text; predetermined flags or binary data representing data having predetermined values or possibilities; numerical values; or other such data. As discussed above, demographic data may include user preferences or interests, such as a favorite sport or team, travel destinations, hobbies, or other such interests. In many implementations, different values of demographic data may be similar to or subsets of other data (e.g. different models of cars may be subsets of a brand, or different brands of cars are subsets of "cars"). Similarities or hierarchical relationships may be referred to as positive associations. Similarly, demographic data may be disparate or disjoint from other data (such as options for which different values cannot simultaneously be true, or explicit negative preferences or dislikes of interests or hobbies). Such disparate relationships may be referred to as negative associations. Positive and negative associations between demographic data values or subsets may also be stored in user profile storage 114.

In many implementations, demographic information about users may be anonymized or disambiguated to protect the privacy of the device user. In many such implementations or similar situations in which personal information about the user of a client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit measurement data to an audience measurement server and/or panel provider. In addition, certain data may be treated in one or more ways before it is stored or used by an audience measurement server, so that personally identifiable information is removed when generating parameters (e.g., demographic parameters). In some implementations, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by content providers.

As discussed above, in many instances, a primary user or owner of a client device 100 will allow another or secondary user B 102B to use the device. While in some instances, the primary user may explicitly logout or end a session or the secondary user may explicitly log in or otherwise indicate that a new user is operating the device, in many implementations, no such explicit indication is made. Accordingly, a content server 110 may not realize that a different user, with different demographics or interests, is using the device, and may incorrectly select content for delivery during such non-canonical sessions. To avoid this, in some aspects of the systems and methods discussed herein, a content server may identify a session as non-canonical due to a mismatch between demographic data typically associated with audience members of content requested by an operator (e.g. user B 102B) of a client device 100 and demographic data associated with the primary user (e.g. user A 102A) of the device. This mismatch may be identified in various ways, discussed in more detail below, by analyzing correlations and overlaps between demographic data.

Figure 2A:
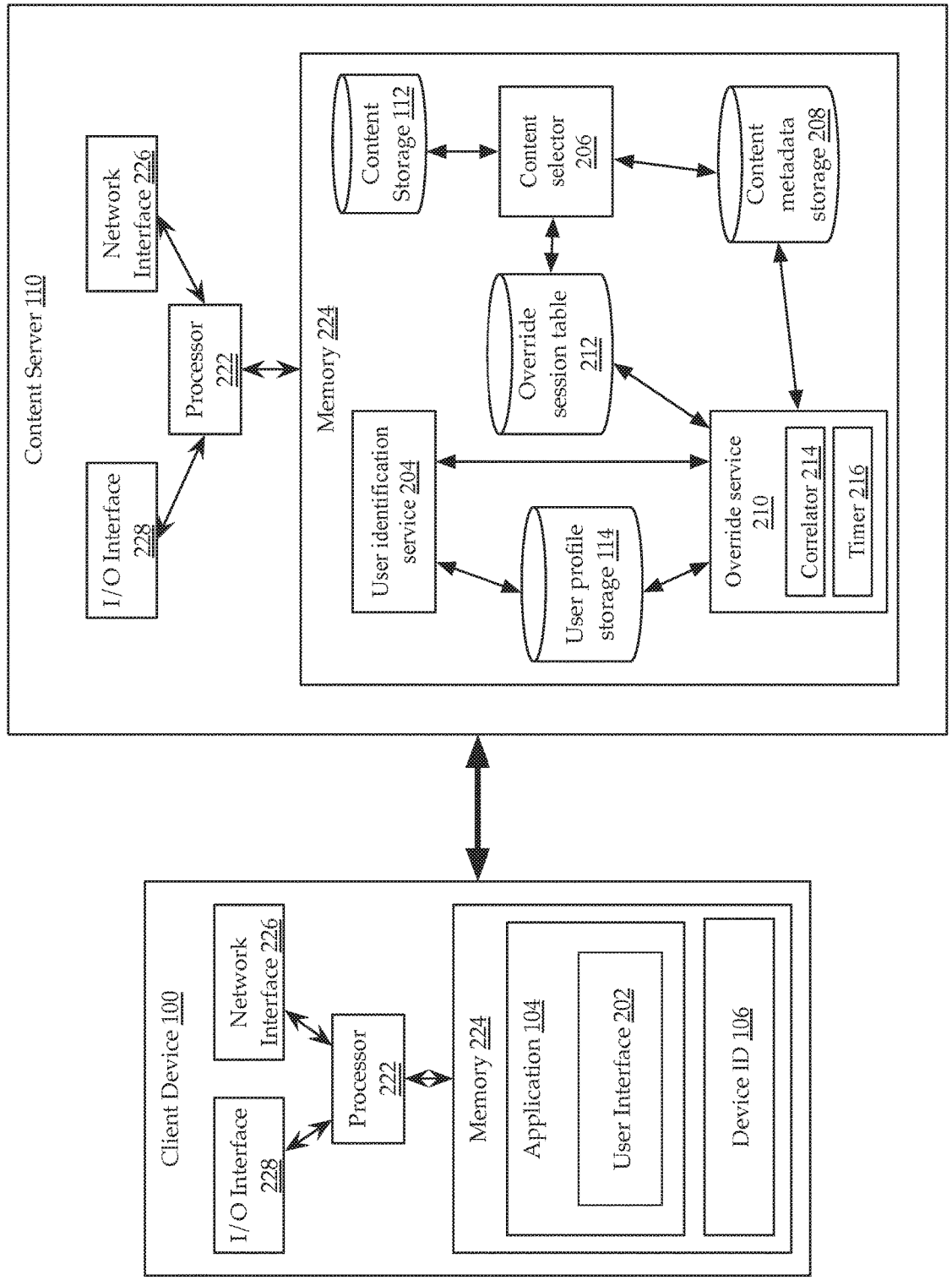
FIG. 2A is a block diagram of client and server devices shown in FIG. 1, according to one implementation.

FIG. 2A is a block diagram of client and server devices shown in FIG. 1, according to one implementation. Although only one content server 110 and client device 100 are illustrated, in many implementations, a plurality of providers or servers and devices may communicate via one or more networks 120.

Client devices) 100 may be referred to variously as a client, device, client device, computing device, user device, or any other such term, may be a desktop computer, laptop computer, tablet computer, smart phone, video game console, smart television or set top box, server, workstation, or any other type and form of computing device capable of communicating over a network 120. In some implementations, the type of client device 100 may be categorized as a mobile device, a desktop device or a device intended to remain stationary or configured to primarily access network 120 via a local area network, or another category of electronic devices such as a media consumption device.

In some implementations, a client device 100 may execute an application, service, server, daemon, routine, or other executable logic 104 for communicating over a network, such as a web browser, mail client, video player, music player, video game, or any other such application 104. Such applications 104 may include a command line interface, graphical user interface, or any combination of these or other interfaces 202. In implementations in which a client device is a smart television or set top box, the client device may receive some content via a first interface, such as a terrestrial, satellite, or cable broadcast; and may receive other content via a second interface, such as a network interface 226 communicating via a network 120 such as an Ethernet or WiFi interface. In other implementations, client device 100 may only receive content via network 120.

In many implementations, client device 100 includes a processor 222 and a memory 224. Memory 224 may store machine instructions that, when executed by processor 222 cause processor 222 to perform one or more of the operations described herein. Processor 222 may include a microprocessor, ASIC, FPGA, etc., or combinations thereof. In many implementations, processor 222 may be a multi-core processor or an array of processors. Memory 224 may include, but is not limited to, electronic, optical, magnetic, or any other storage devices capable of providing processor 222 with program instructions. Memory 224 may include a floppy disk, CD-ROM, DVD, magnetic disk, memory chip, ROM, RAM, EEPROM, EPROM, flash memory, optical media, or any other suitable memory from which processor 222 can read instructions. The instructions may include code from any suitable computer programming language such as, but not limited to, C, C++, C #, Java, JavaScript, HTML, XML, Python and Visual Basic.

Client device 100 may include one or more network interfaces 226. A network interface 226 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network 120. In many implementations, client device 100 may include a plurality of network interfaces 226 of different types, allowing for connections to a variety of networks 120 or a network 120 such as the Internet via different sub-networks. Client device 100 may also include other interfaces for receiving terrestrial, satellite, or cable analog or digital broadcasts, as discussed above.

Client device 100 may include one or more user interface devices 228. A user interface device 228 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 100, such as a built-in display, touch screen, microphone, etc., or external to the housing of client device 100, such as a monitor connected to client device 100, a speaker connected to client device 100, etc., according to various implementations.

Client device 100 may include in memory 224 an application 104 or may execute an application 104 with a processor 222. Application 104 may be an application, applet, script, service, daemon, routine, or other executable logic for receiving content and for transmitting responses, commands, or other data. In one implementation, application 104 may be a web browser, while in another implementation, application 104 may be a video game. Application 104 may include functionality for displaying content received via network interface 226 and/or generated locally by processor 222, and for transmitting interactions received via a user interface device 228, such as requests for websites, selections of survey response options, input text strings, etc.

Application 104 may be a media player or include an embedded media player, such as a plug-in or native media player within a web browser. Application 104 may provide user interfaces 202 for interacting with content played in the media player, such as a skip control, dislike button, or any similar interface. In some implementations, a user of client device 100 may utilize a user interface 202 to request content from a content server 110. For example, a user of a client device 100 may search for and select for viewing television programs, movies, music videos, web pages, songs, podcasts, or any other type and form of content. In many implementations, a client device 100 may transmit a request for the content and/or a search request for content, and may include a device identifier 106 or cookie with the request. Content provider 110 may respond with the requested content or search results, and may, in some implementations, select additional content to provide to client device 100 from third party providers, such as advertising or featured content. Requests may be transmitted in any type and form, including HTTP GET or POST requests, FTP requests, remote procedure calls, communications via an application programming interface (API), or any other type and form of communication to a content server 110.

Also illustrated in FIG. 2A is a block diagram of an implementation of a content provider 110, content server, or similar device. As with client devices 100, server 110 may include one or more processors 222, memories 224, network interfaces 226, and user interfaces 228. In some implementations referred to as headless servers, a server 110 may not include a user interface 228, but may communicate with clients 100 with user interfaces 228 via a network 120. Memory 224 may include content storage 112, such as storage of webpages, images, audio files, video files, data files, or any other type and form of data. In some implementations, memory 224 may store one or more applications (not illustrated) for execution by processor 222 of the server, including servers, web servers, mail servers, file sharing servers, peer to peer servers, or other such applications for delivering content stored in content storage.

In some implementations, a server 110 may execute a user identification service 204. User identification service 204 may comprise an application, service, server, daemon, routine, or other executable logic for identifying and/or authenticating a device identifier 106 transmitted from a client device 100, including receiving device identifiers and/or requests for items of content or information about such requests, generating and transmitting transient device identifiers (e.g. session cookies or temporary identifiers), or any other such functions. In one implementation, a user identification service 204 may maintain a database, table, or index of device identifiers and associated user identifiers. For example, as discussed above, in many instance, a single user may have a plurality of different devices, each associated with its own device identifier (e.g. tablet, laptop, smartphone, etc.). To maintain a common demographic profile, each device identifier may be associated with a single user identifier. Upon receipt of a device identifier, user identification service 204 may identify the corresponding user identifier from the database. User identifiers may comprise any type and form of identifier, such as a user name, account name, user ID, string, hash result, or any other type and form of unique identifier.

Figure 2B:
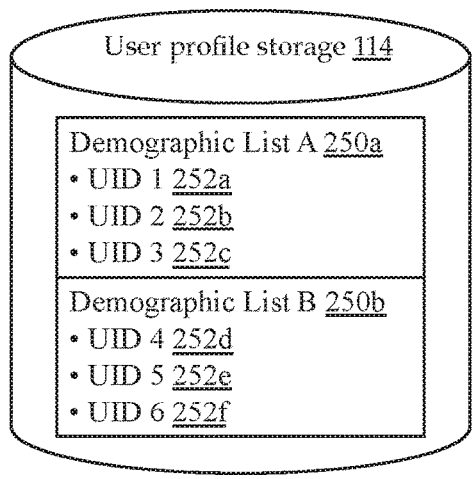
FIGS. 2B-2D are illustrations of implementations of databases and tables used by the systems illustrated in FIG. 2A.

User identification service 204 may communicate with or maintain a user profile storage 114. Although shown stored within server 110, in many implementations, user profile storage 114 may be stored on one or more external storage devices. User profile storage 114 may comprise a database, flat file, data array, or any other type and form of data structure or structures for identifying device identifiers and/or user identifiers and associated demographic lists or traits. Referring briefly to FIG. 2B, illustrated is one implementation of a user profile storage 114. In one implementation, user profile storage 114 may comprise one or more demographic lists 250A-250B, referred to generally as demographic lists 250. Each demographic list 250 may be associated with a corresponding demographic trait or value. As discussed above, a demographic trait or value may refer to physical demographics, such as age or location, or may refer to interests, hobbies, or other such traits that may be common in a plurality of users. Demographic characteristics or traits may be explicitly obtained, via surveys or profile questions, or may be implicitly obtained, via requests associated with the device being similar to requests associated with a device having known characteristics, or via a search history or other behaviors of the user of the device. Characteristics or traits may be identified with values, such as where a trait may have several different potential values. As discussed above, in many implementations, demographic traits may be anonymized.

Each demographic list may include zero, one, or more device identifiers and/or user identifiers 252A-252F, referred to generally as user identifiers or UID 252. Although shown indexed by demographic lists 250, in other implementations, user profile storage 114 may comprise entries for each UID 252 with associated demographic lists 250. Accordingly, user profile storage 114 may associate demographic lists 250 and UIDs 252 in any convenient form or manner.

Returning to FIG. 2A, a content server may execute a content selector 206, sometimes referred to as a content personalization system. Content selector 206 may comprise an application, service, server, daemon, routine, or other executable logic for selecting content for delivery to device, the content selected based on demographic traits or values associated with the device identifier (or corresponding UID 252). Content stored in content storage 112, including any type and form of content such as audio or video content, may be associated with zero, one, or more selection criteria. Selection criteria may comprise a set of one or more demographic traits or values that a content provider has designated for the content to be provided to. For example, an item of content such as an advertisement, may be selected for users of a certain age, location, and/or set of interests. In many implementations, criteria may include Boolean operators (e.g. "trait 1 AND trait 2" or "trait 1 OR trait 2") to provide further flexibility. In many implementations, content selector 206 may select content for delivery to a client based on demographic traits associated with the device identifier of the client device (and associated with the presumed or primary user of the device). Such content may be in addition to content requested by the user, such as featured content or advertising. In some implementations, an item of content may have no selection criteria; such content may be selected by content selector 206 for delivery regardless of demographic traits of the user or associated with the device identifier.

As discussed above, in some implementations, a user may be using the client device that is not associated with the device identifier of the client device, during a non-canonical session. Selecting content for such users based on demographic traits associated with the device identifier may result in mis-selected content that the user is not interested in. This may result in user frustration or annoyance, reduced click-throughs or conversions, or other such consequences. To avoid this, the content provider 110 may identify non-canonical sessions and may disable demographic personalization for the session or stop selecting content based on demographic traits associated with the device identifier. In some implementations, upon disabling of personalization, the content selector 206 may select content based on its similarity to other content requested by the user during the non-canonical session. In other implementations, the content selector 206 may select random content or content associated with no selection criteria, as discussed above.

Figure 2C:
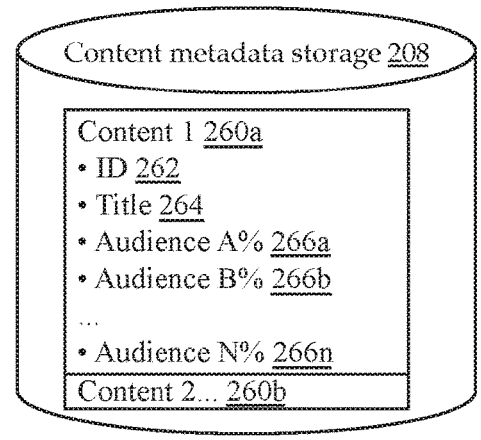

As noted above, during a non-canonical session, the alternate or non-primary user may request content for delivery to the client device. This requested content may be used to identify non-canonical sessions. The requested content may be associated with one or more demographic traits or audience profiles, representing a likely audience for the requested content. Such profiles may be stored in content metadata storage 208. Content metadata storage 208 may comprise a database, flat file, table, array, or other data structure for storing metadata about content in content storage 112. Referring briefly to FIG. 2C, illustrated is one such implementation of a content metadata storage 208. Content metadata storage 208 may comprise an entry for each item of content 260A-260N (referred to generally as entries 260). Each entry may comprise an identifier 262 of the item of content; a title 264 of the item of content; and any other information about the item of content, including type, length, storage location or uniform resource locator (URL), genre, or any other such information. Each entry may further identify one or more likely audiences and corresponding percentages 266A-266N, referred to generally as audience percentages 266. Each audience percentage 266 may correspond to a demographic trait or set of demographic traits (e.g. a combination or Boolean AND of a plurality of demographic traits) and may have an associated percentage likelihood that a user requesting the item of content has the corresponding demographic trait or traits. For example, a first trait may have a percentage of 60%, indicating that 60% of users requesting the content have that first trait. Audience percentages 266 may also apply to combinations of demographic traits, such as a location and interest or gender and age. Audience percentages 266 may be populated by content providers, measurement services, or other entities. In some implementations, audience percentages 266 may be determined based on requested content during sessions explicit identified as canonical (e.g. following a user login); on surveys presented before, after, or during presentation of the content; on lookups to external data sources; or on evaluations based on other content metadata title, description, keywords, genre, etc.). Although shown in a single database, in many implementations, each entry in content metadata storage 208 may be stored as metadata with the corresponding item of content (e.g. as ID3 tags or similar metadata, in associated files or manifests such as XML data or M3U playlists, or in any other such format). Accordingly, such entries may be retrieved with retrieval of the corresponding items of content.

A session may be identified as non-canonical based on a mismatch or disagreement between a demographic profile associated with a device identifier of a client device or demographic lists 250 including a UID 252 of the device or primary user, and audience percentages 266 associated with a requested item of content. Such a mismatch may imply that the user operating the client device is not associated with the device identifier, and accordingly, selection of additional content based on demographics associated with the device identifier should be disabled, at least temporarily. Returning to FIG. 2A, in some implementations, the content provider 110 may execute an override service 210. Override service 210 may be an application, service, server, daemon, routine, or other executable logic for comparing or correlating demographic profiles associated with device identifiers 106 and audience percentages 266 associated with requested content. For example, the client device may transmit a request for an item of content and the device identifier 106. The override service 210 may retrieve a demographic profile or compile an identification of demographic lists 250 including the corresponding UID. The override service 210 may also retrieve audience percentages 266 for the requested content from content metadata storage 208. The override service 210 may compare traits of the demographic profile and audience percentages and calculate an overlap score, indicating a likelihood that the user of the client device is the user associated with the demographic profile or not, and accordingly, whether or not the session is canonical. If the session is not canonical, the override service may add an entry to a session override table 212. Prior to selecting additional content, a content selector 206 may consult override session table 212 to determine if an entry for the session exists. If so, then the content selector 206 may disable personalization and/or select additional content that has no selection criteria or is only associated with requested content, rather than the demographic profile.

Figure 2D:
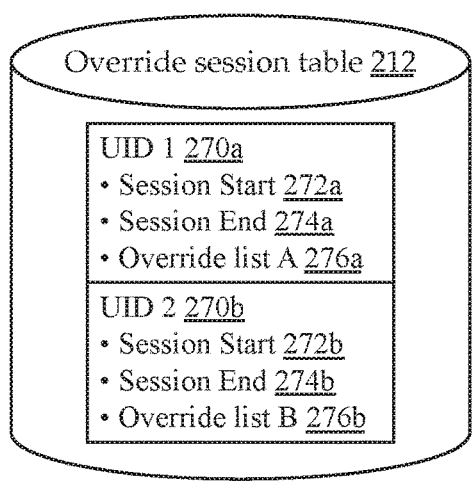

Referring briefly to FIG. 2D, illustrated is one implementation of an override session table 212. Override session table 212 may comprise a database, flat file, data array, or other data structure for storing entries 270A-270B associated with a UID, referred to generally as override entries 270. In many implementations, personalization may be only overridden temporarily for any device identifier or corresponding UID, as the secondary user may return the device to the primary user and subsequent requests may be canonical. Accordingly, in many implementations, each override entry 270 may include a session start time 272A-272B (referred to generally as a session start time 272) and/or a session end time 274A-274B (referred to generally as a session end time 274). In other, similar implementations, an override entry 270 may include a start time and duration, or just an end time for the override. The duration and/or end time may be extended based on further requests from the client device that are identified as non-canonical as discussed above. For example, upon identifying a first non-canonical request for content from a client device, an override service may generate an entry with a session end time 274 ten minutes in the future. During that time, while personalization is disabled, the content provider may receive a second request for content from the client device and the override service may identify the second request as non-canonical. In response, in some implementations, the override service may extend the session end time 274 by another ten minutes, or any other such time period. In some implementations, each override entry 270 may include an override list 276A-276B, referred to generally as override lists 276. Each override list 276 may identify demographic lists 250 or demographic traits or values associated with the UID or device identifier for which content personalization should be disabled. In some implementations, personalization may not be disabled for all demographic traits. For example, given a primary user with demographic traits A, B, and C, if the override service infers that the actual (e.g. secondary) user does not have trait A or B, but has an overlap with trait C, then selection of content for traits A and B may be disabled without disabling content selection for trait C. One common example may be geographic location—as the primary and secondary users are likely in a similar area and may both be interested in local content, the override service may determine that the location demographic of the user profile overlaps the location demographic of the audience of the requested content, and accordingly not override or disable content selection of localized content.

Returning to FIG. 2A, in some implementations, override service 210 may comprise a correlator 214. Correlator 214, sometimes referred to as a comparator or comparison engine, may comprise a subroutine, service, server, daemon, or other executable logic for comparing multivariate demographic profiles and audience percentages. Correlator 214 may comprise a bitwise comparator for comparing integer values or bit strings, a mathematical comparator, an analog comparator, or any other type and form of hardware or software for comparing values to each other and/or to thresholds. In other implementations, correlator 214 may use any type and form of algorithm to determine a correlation between a statistical value for presence of a characteristic in aggregated device measurement data and presence of the characteristic in demographic data. Correlator 214 may use a Pearson correlation algorithm to compare a frequency of a characteristic in data with a frequency of the characteristic in other data. The resulting correlation coefficient may be compared to a threshold, and a confidence score associated with the characteristic may be increased or decreased responsive to the coefficient being above or below a threshold.

Override service 210 may, in some implementations, maintain a timer 216. Timer 216 may be used to determine whether override entries in override session table 212 are still active, and/or whether they should be cleared or deleted. In many implementations, timer 216 may be executed by an operating system of the server 110.

Figure 3A:
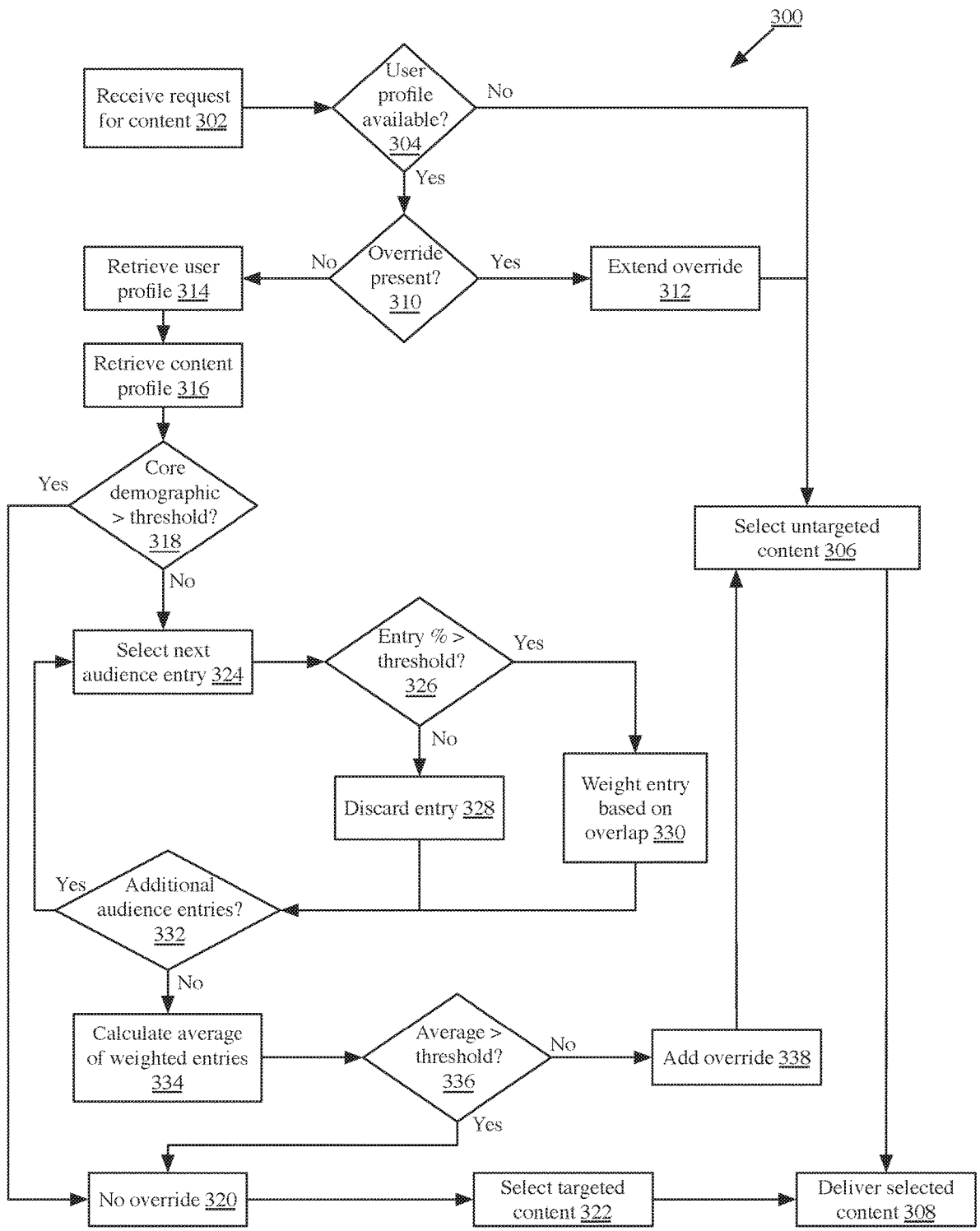
FIG. 3A is a flow chart of a method for identifying non-canonical sessions and delivering content, according to one implementation.

FIG. 3A is a flow chart of a method 300 for identifying non-canonical sessions and delivering content, according to one implementation. At step 302, a content provider or server such as content server 110 may receive a request for an item of content from a client device 100. As discussed above, the request may be on the behalf of a user, such as a primary user of the device associated with the device identifier, or may be on the behalf of an alternate or secondary user not associated with the device identifier. The request may be in any type and form of protocol, including HTTP GET or POST requests, FTP requests, remote procedure call or API requests, or any other type and form of request. Receiving the request may comprise establishing a communication session with the client device, such as a transport layer session. Accordingly, receiving the request may comprise performing a handshaking protocol or other functions. The request may comprise an identifier of a requested item of content (e.g. name, URL, keyword, genre, etc.), and may comprise a user identifier, device identifier, cookie, or other such identifier that may be associated with a primary user (regardless of whether the primary user is using the client device). In some implementations, the request may be a search request, such as a keyword search or search for a web page, video, audio file, or other such search. The content server may receive the request via a network interface over a network, such as network interface 226 and network 120. In some implementations, a front end, gateway, or load balancer may receive the request and forward the request to a content server.

At step 304, a user identification service of the content server may determine if a user profile is available in a user profile storage or database corresponding to a device identifier, user identifier, or cookie in the request. If not, then no demographic profile may be obtained for the primary user. Accordingly, at step 306, a content selector of the content server may select additional random content for delivery to the client device, such as advertising or featured content with no selection criteria, in some implementations. Although referred to as "random" content, in many implementations, such content may be selected without use of demographic traits, but may be selected according to an ordered list, auction system, or any other criteria. Accordingly, random content may simply be content not selected via a personalization system, and thus 'random' in association to or connection with demographic traits of a user. In other implementations, the content selector may select additional content based on the additional content having selection criteria matching audience percentages for the requested content. For example, if the request is for a video relating to cars, the content selector may select additional content with selection criteria matching a demographic group having an interest in cars.

At step 308, the content server may deliver the requested content and selected content. In some implementations, delivering the requested content and selected content may comprise generating a playlist or manifest identifying both items of content, such that the client device or an application of the client device may transmit further requests for the requested content and selected content (e.g. a manifest identifying URLs of a plurality of blocks or chunks of the content for streaming playback, and including the selected content as pre-roll, post-roll, or interstitial content). In other implementations, delivering the requested content and selected content may comprise generating a webpage comprising the requested content and selected content (e.g. as banner advertising, pop-up or pop-under advertising, as featured search results, or any other type and form of delivery). In still other implementations, delivering the requested content and selected content may comprise generating instructions for an application on the client to retrieve, receive, and/or render the requested content and selected content.

If a user profile is available at step 304, then at step 310, an override service of the content server may determine if an entry for the device identifier or UID is present in an override session table. Determining if an entry is present may comprise retrieving the table and/or searching the table for the UID or device identifier, retrieving an entry stored at an index of the device identifier or UID, or any other such function. If an override entry is present, then at step 312, the override may be extended. The override service may extend the override by adding time to a session duration or session end time, or any other such function. The added time may be one minute, five minutes, ten minutes, one hour, or any other such time. In some implementations, the override service may set a "don't clear" flag or otherwise mark the entry. The override service may periodically remove any entries in the override table that lack a "don't clear" flag, and remove "don't clear" flags on entries that have them. This may be more efficient, at the expense of less customization for session timing. If the override is present, then the content selector may select random content at step 306 and deliver the content at step 308, as discussed above. In some implementations, even if an override is present for the device identifier or user identifier within the override session table, the override service may perform steps 314-320, discussed in more detail below, to determine whether to remove the override early.

If an override is not present, then at step 314, the override service may retrieve a user demographic profile corresponding to the UID or device identifier from a user profile storage or database. As discussed above, the demographic profile may comprise a set of demographic identifiers or values, and may be stored as a database entry, a vector, an array, a string with predetermined positions, or any other such format.

At step 316, the override service may retrieve a content profile for the requested content or content previously delivered to the client device from content metadata storage. As discussed above, content metadata or profiles may be stored in a database, or may be stored with or as part of the content, such as in metadata or headers of the file, in a manifest or playlist, or otherwise. Accordingly, the override service may retrieve the profile from various locations, depending on implementation. In some implementations, the override service may search through a database to identify an entry or entries corresponding to the requested content.

In some implementations, for efficiency, at step 318, the override service may first compare a core or primary demographic from the user demographic profile to the content profile for the requested content to determine whether the core demographic is present above a predetermined threshold. If so, then the override service may determine that no override is necessary at step 320. This may save time and processing resources if, for example, a large percentage of the audience of the requested content matches the core demographic of the user profile, indicating that the session may likely be canonical. In some implementations, core demographics may be a narrowest set of demographic traits or combination of all of the traits identified in the user profile. For example, given a user profile indicating a user has traits A, B, and C, a core demographic may be "trait A AND trait B AND trait C". If the content profile shows that this combination occurs at a high audience percentage, then the session is likely canonical, and traits need not be compared individually; if the narrow combination of all three traits is present in the audience percentages at a high level, then by definition, each individual trait must also be present at a high (if not higher) level. The threshold be set to any value, such as 10%, 20%, 50%, or any other value.

As discussed above, in some implementations, if the override service determines no override is necessary, at step 320, the override service may remove any override in an override session table for the device identifier or user identifier. For example, in such implementations, even if an override is identified as present for the device identifier or user identifier within the override session table at step 310, the override service may perform steps 314-320 to determine whether to remove the override early.

At step 322, the content selector 206 may select additional content based on the demographic profile of the user. As discussed above, selected content may be identified with demographic criteria. Content selector 206 may select such content based on criteria including the demographic traits of the user profile. In some implementations, content selector 206 may apply other selection policies or rules, such as selecting content not provided recently, selecting content also sharing demographic criteria with the content profile of the requested content, based on an auction system for payments by third party content providers, or any other such methods. The content may be delivered at step 308, as discussed above.

If the core demographic is not greater than the predetermined threshold, then at step 324, a next (e.g. first) audience percentage or entry of the content profile may be selected by the override service. For example, the override service may select a first entry having a highest percentage, and on repeated iterations of steps 324-332, may select each next entry or next lowest percentage until complete.

At step 326, in some implementations, the override service may determine if the selected audience percentage entry has a percentage above a predetermined threshold, and discard the entry at step 328 if the percentage is not above the threshold. This may be done to remove outliers for which a canonical or non-canonical inference may be weak. The threshold may be set to any level, such as 10%, 20%, or any other value.

At step 330, if the percentage is above the threshold, the override service may weight the percentage or calculate a weighted score for the audience demographic based on a correlation with a corresponding demographic trait of the user profile. For example, if the audience demographic overlaps with the user demographic, then the weight of the percentage may be increased or a positive weighting applied or an increased score calculated; while if the audience demographic does not overlap with the user demographic or contradicts the user demographic, then a negative weighting may be applied or a decreased score calculated.

For example, in one implementation, a correlation between a demographic trait of the user and the corresponding audience percentage may be calculated. If the correlation is above a threshold, a score for the correlation may be increased or the percentage may be given an increased weight (e.g. by increasing the percentage or a score corresponding to the percentage by a predetermined amount). If the correlation is below a second threshold, the score or percentage may be decreased. Between the thresholds, in some implementations, the score may not be adjusted.

Figure 3B:
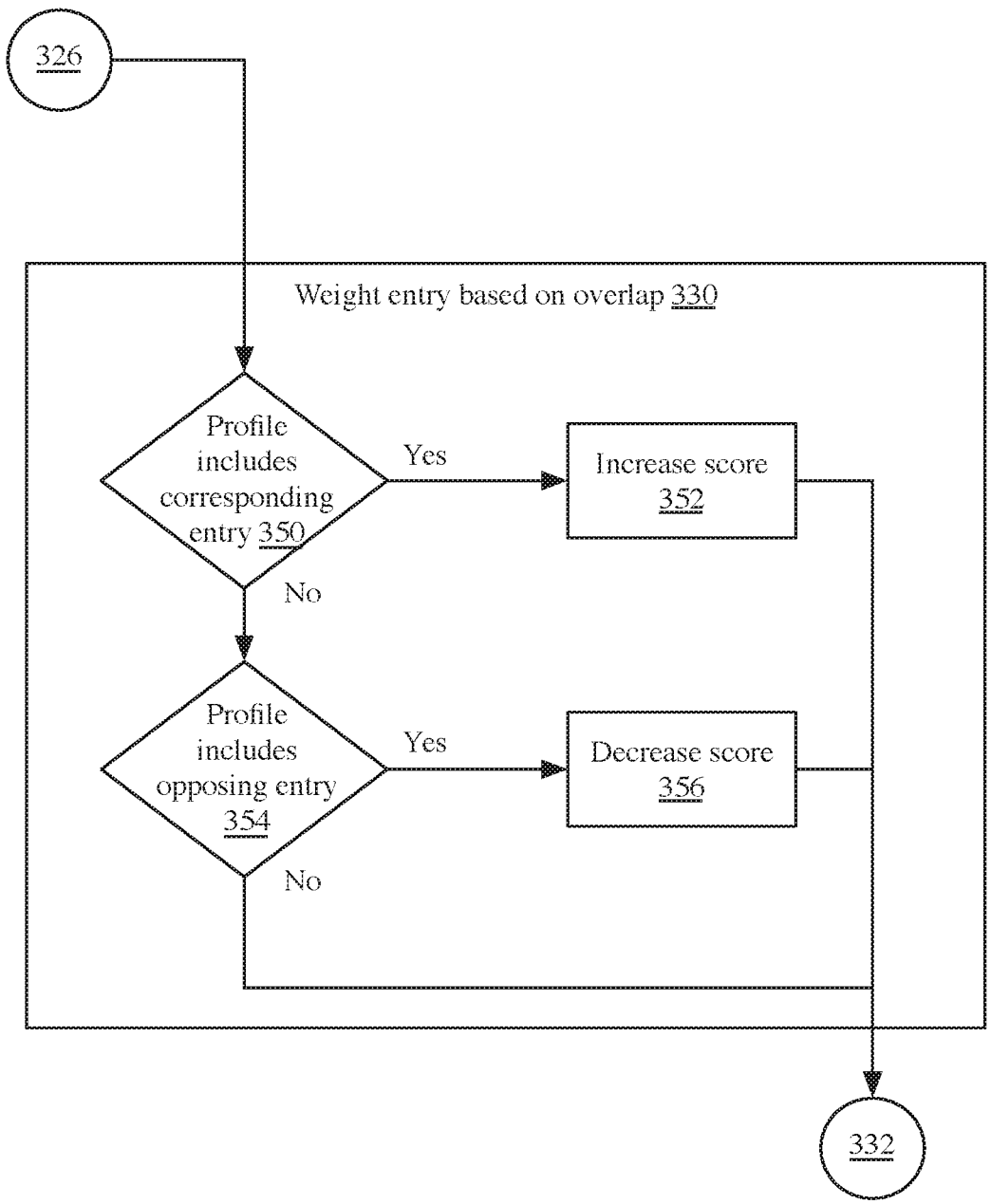
FIG. 3B is a flow chart of a method for weighting demographic entry overlap, according to one implementation.

Another implementation of step 330 is illustrated in the flow chart of FIG. 3B. Such implementations may be used for demographics with disparate or disjoint values, such as "likes sports" or "dislikes sports". At step 350, the override service may determine if the user profile includes a corresponding entry to the demographic of the audience percentage entry. If so, at step 352, a score for the entry or the percentage may be increased by a predetermined amount (e.g. 10 percent, 15 percent, or any other such amount). Similarly, at step 354, the override service may determine if the user profile includes an opposing entry to the demographic of the audience percentage entry. If so, at step 356, the score for the entry or the percentage may be decreased by a predetermined amount (e.g. 10 percent, 15 percent, or any other such amount). If the profile includes neither a corresponding nor opposing entry, then in some implementations, the percentage may not be adjusted. The method of FIG. 3A may then resume.

Figure 3C:
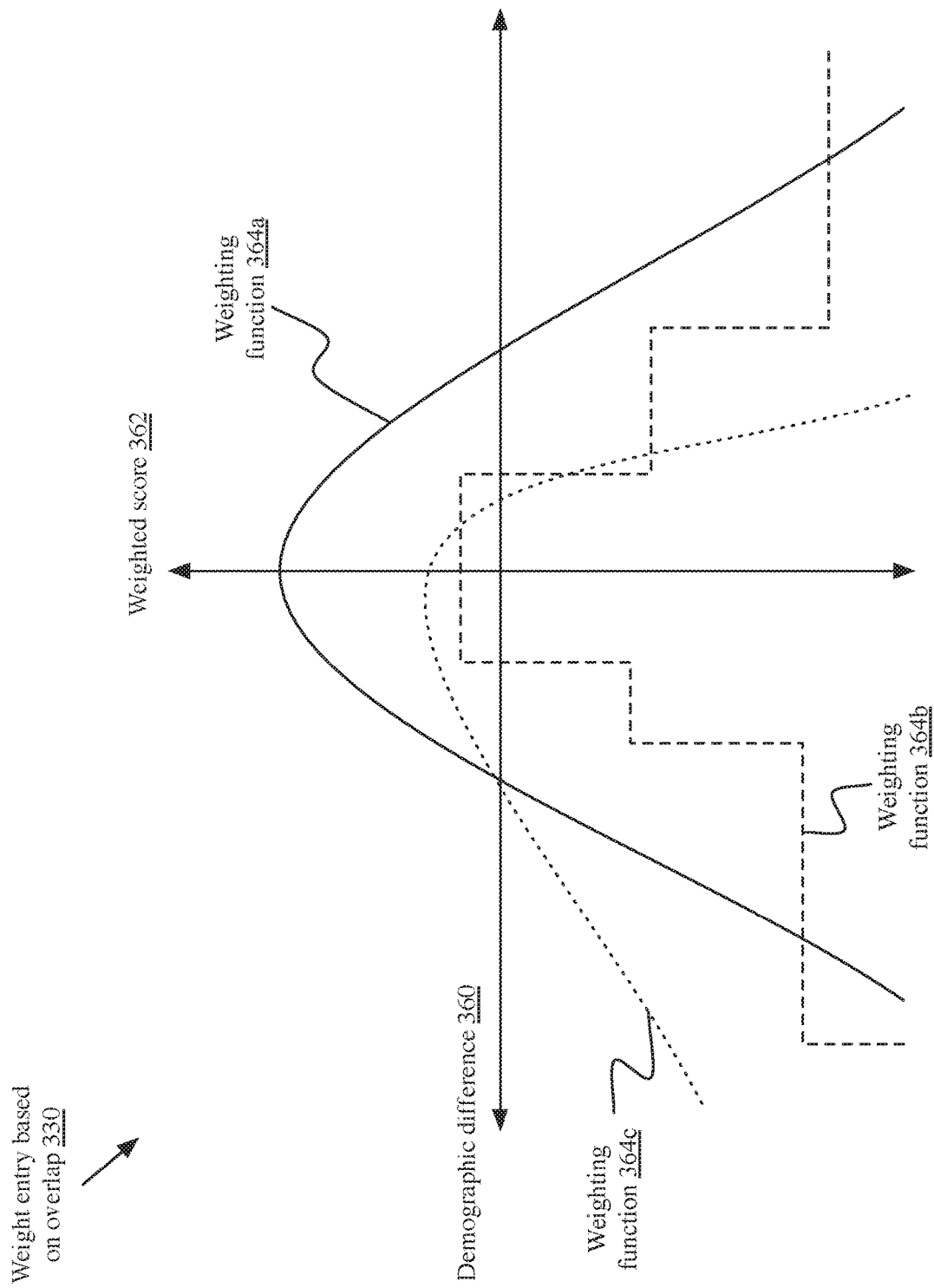
FIG. 3C is a graph illustrating another method for weighting demographic entry overlap, according to another implementation.

In another implementation in which a demographic trait may have a wide range of values, the value from the user profile and audience percentage entry value for the trait may be directly compared and a weight or score adjusted based on the difference. For example, FIG. 3C is a graph illustrating examples of such implementations for weighting demographic entry overlap. The override service may calculate a difference between a value of the demographic trait for the audience entry and the value of the demographic trait for the user profile, such as a difference between two ages. This may represent an x-value 360 for a weighting function 364a-364c, referred to generally as a weighting function 364. The override service may then determining a corresponding y-value 362 for the function, which may be positive or negative, and may be applied as a score or weight to the audience percentage. For example, given function 364a and a difference in values near zero, a high positive weight may be applied to the audience percentage. As shown in function 364c, the functions need not be symmetrical around either axis. Similarly, as shown in function 364b, the function may be a stepwise function. This may be particularly useful with demographic ranges for audience percentages (e.g. ages 45-54).

Returning to FIG. 3A, after calculating a score or weighting the audience percentage at step 330, the override service may determine if there are additional audience percentages in the content profile. If so, steps 324-332 may be performed for each additional percentage (in some implementations, steps 324-332 may be performed in parallel for each audience percentage).

Once all iterations of steps 324-332 are complete, at step 334, the override service may calculate an average of the scores or weighted percentages for the content profile. As noted above, based on overlap between the content profile and user profile, some percentages may be increased while other percentages are decreased. Still other percentages may discarded from the calculation if too low.

At step 336, the average score or percentage may be compared to a threshold representing the weighted average likelihood of overlap between the user profile and content profile. If the score or percentage is above the threshold, then the session may be inferred to be canonical and no override may be applied at step 320. If the score or percentage is below the threshold, then the session may be inferred to be non-canonical, and an override entry may be added to the override table at step 338, as discussed above. In some implementations, the override service may add a session start time, session end time, duration, and one or more demographic categories (such as the demographic categories corresponding to the audience percentages of the content that were included in the weighted average at step 334). Random content may be selected at step 306 and delivered at step 308, as discussed above.

In some implementations, as discussed above, content personalization may be disabled for some demographic traits but not others. In some such implementations, step 334 may be skipped or an average not calculated of the scores across various demographics. Instead, steps 336 and 338 may be performed for each demographic trait or score individually and separate overrides generated. For example, given a user with traits A, B, and C, and requested content having audience percentages of 20% for A, 10% for B, and 90% for C, the override service may adjust these percentages or generate weighted scores at step 330 as discussed above, and may then compare each score separately to a threshold (such as 50%, for example, although any value may be used). The override service may determine that selection for traits A and B should be disabled but selection for trait C may be used. The content provider may then either select content at step 322 for trait C or random content at step 306, as discussed above.

Accordingly, the systems and methods discussed herein provide automatic inference and identification of non-canonical user sessions, and may dynamically enable and disable personalized content selection. This may reduce user frustration and instances of low conversions or click-throughs for mis-selected content based on false demographic inferences.

In one aspect, the present disclosure is directed to a method for identifying non-canonical sessions via demographic correlations. The method includes receiving, by a content server from a client computing device, a request for an item of content, the request comprising an identifier associated with a first user. The method also includes retrieving, by an override service of the content server from a content metadata database, a first demographic profile associated with the requested item of content. The method also includes retrieving, by the override service from a user profile database, a second demographic profile associated with the identifier associated with the first user. The method further includes calculating, by a correlator of the override service, a comparison score between the first demographic profile and second demographic profile. The method also includes determining, by the override service, that the score is below a predetermined threshold. The method also includes identifying, by the override service, the request as associated with a second user different from the first user, based on the score being below the predetermined threshold; and disabling a content personalization system of the content server for the client computing device, responsive to the identification.

In some implementations, the method includes selecting, by a content selector of the content provider, a second item of content for transmission to the client computing device; and transmitting, by the content provider, the requested item of content and the second item of content to the client computing device. In a further implementation, the method includes selecting the second item of content from a plurality of items of content, responsive to the second item of content having no selection criteria. In another further implementation, the method includes selecting the second item of content from a plurality of items of content, responsive to the second item of content having a demographic profile similar to the first demographic profile associated with the requested item of content.

In some implementations, the first demographic profile further comprises a demographic trait and a corresponding percentage; and the method includes increasing the percentage by a predetermined amount, responsive to the first demographic profile and second demographic profile both including the demographic trait. In other implementations, the first demographic profile further comprises a demographic trait and a corresponding percentage; and the method includes decreasing the percentage by a predetermined amount, responsive to the second demographic profile not including the demographic trait. In still other implementations, the first demographic profile further comprises a first value for a demographic trait and a corresponding percentage and the second demographic profile further comprises a second value for the demographic trait; and the method includes adjusting the percentage according to a predetermined function based on a difference between the first value and second value for the demographic trait. In a further implementation, the first value is a range and the predetermined function is a stepwise function.

In some implementations, the first demographic profile further comprises a plurality of demographic traits and a corresponding plurality of percentages and the second demographic profile further comprises a second plurality of demographic traits; and the method includes adjusting each of the plurality of percentages of the first demographic profile, based on an overlap between the corresponding demographic traits of the first demographic profile and second demographic profile; and calculating the comparison score as an average of the adjusted plurality of percentages. In other implementations, the method includes generating, by the override service, an entry in an override session table comprising an identification of the client computing device.

In another aspect, the present disclosure is directed to a system for identifying non-canonical sessions via demographic correlations. The system includes a content server comprising a network interface in communication with a client computing device. The system also includes a processor executing a content selector, an override service, and a memory device storing a user profile database and content metadata database. The network interface is configured to receive, from the client computing device, a request for an item of content, the request comprising an identifier associated with a first user. The override service is configured to retrieve, from the content metadata database, a first demographic profile associated with the requested item of content; retrieve, from the user profile database, a second demographic profile associated with the identifier associated with the first user; and calculate a comparison score between the first demographic profile and second demographic profile. The override service is also configured to determine that the score is below a predetermined threshold, and identify the request as associated with a second user different from the first user, based on the score being below the predetermined threshold. The content selector is configured to disable a content personalization system for the client computing device, responsive to the identification.

In some implementations of the system, the content selector is further configured to select a second item of content for transmission to the client computing device; and the network interface is further configured to transmit the requested item of content and the second item of content to the client computing device. In a further implementation, the content selector is further configured to select the second item of content from a plurality of items of content, responsive to the second item of content having no selection criteria. In another further implementation, the content selector is further configured to select the second item of content from a plurality of items of content, responsive to the second item of content having a demographic profile similar to the first demographic profile associated with the requested item of content.

In some implementations, the first demographic profile further comprises a demographic trait and a corresponding percentage; and the override service is further configured to increase the percentage by a predetermined amount, responsive to the first demographic profile and second demographic profile both including the demographic trait. In other implementations, the first demographic profile further comprises a demographic trait and a corresponding percentage; and the override service is further configured to decrease the percentage by a predetermined amount, responsive to the second demographic profile not including the demographic trait. In still other implementations, the first demographic profile further comprises a first value for a demographic trait and a corresponding percentage and wherein the second demographic profile further comprises a second value for the demographic trait; and the override service is further configured to adjust the percentage according to a predetermined function based on a difference between the first value and second value for the demographic trait. In a further implementation, the first value is a range and the predetermined function is a stepwise function.

In some implementations of the system, the first demographic profile further comprises a plurality of demographic traits and a corresponding plurality of percentages and the second demographic profile further comprises a second plurality of demographic traits; and the override service is further configured to: adjust each of the plurality of percentages of the first demographic profile, based on an overlap between the corresponding demographic traits of the first demographic profile and second demographic profile, and calculate the comparison score as an average of the adjusted plurality of percentages. In some implementations, the override service is further configured to generate an entry in an override session table comprising an identification of the client computing device, responsive to identifying the request as associated with a second user different from the first user.

As discussed above, in many such implementations, demographic data or traits may be anonymized or disambiguated to protect the privacy of users. In many such implementations or similar situations in which personal information about the user of client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit measurement data to a content provider. In addition, certain data may be treated in one or more ways before it is stored or used by a content provider, so that personally identifiable information is removed when generating parameters (e.g., demographic parameters). A user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the audience measurement servers, panel providers, and content providers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

In some embodiments, the features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. in alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A system to identify non-canonical sessions, comprising:
   a content server comprising a network interface to communicate with a device, a processor that executes a content selector and an override service, and a memory device that stores a profile database and content metadata database;
   the network interface configured to receive, from the device, an acoustic request for content, the received acoustic request associated with an identifier associated with a first anonymous user;
   the override service configured to:
      retrieve, from the content metadata database, a first profile associated with the acoustically requested content including a first value and a first score for each of a plurality of traits,
      retrieve, from the profile database, a second profile, the second profile associated with the identifier and including a second value and a second score for each of the plurality of traits,
      adjust each of the first scores to generate adjusted first scores, based on an overlap between the corresponding traits of the first profile and second profile,
      calculate a comparison score between the first profile and second profile as an average of each of the adjusted first scores and second scores,
      determine that the comparison score is below a predetermined threshold, and
      identify the acoustic request as associated with a second anonymous user different from the first anonymous user, based on the comparison score being below the predetermined threshold; and
      identify a first trait shared by the first profile and the second profile and a second trait not shared by first profile and the second profile; and
   the content selector configured to disable content personalization for the device for the second trait and enable content personalization for the device for the first trait, responsive to the identification of the acoustic request as associated with the second anonymous user.

2. The system of claim 1, wherein the acoustic request for content includes a speech request.

3. The system of claim 1, wherein the network interface provides audio content to the device responsive to the acoustic request for content and subsequent to disablement of the content personalization system for the device.

4. The system of claim 1, comprising:
   the override service configured to increase a first score of the first profile for a first trait by a predetermined amount, responsive to the first profile and second profile both including the first trait.

5. The system of claim 1, comprising:
   the override service configured to decrease a first score of the first profile for a first trait by a predetermined amount, responsive to the second profile not including the first trait.

6. The system of claim 1, comprising:
   the content selector configured to select audio content for transmission to the device; and
   the network interface configured to transmit the audio content to the device.

7. The system of claim 6, comprising:
   the content selector configured to select the audio content from a subset of audio content having no selection criteria.

8. The system of claim 1, comprising:
   the override service configured to generate an entry in an override session table comprising an identification of the device, responsive to identifying the acoustic request as associated with a second anonymous user different from the first anonymous user.

9. The system of claim 1, comprising:
   the override service configured to adjust each of the first scores of the first profile for the plurality of traits according to a predetermined weighting function based on an overlap between the corresponding traits of the first profile and second profile.

10. A method of identifying non-canonical sessions, comprising:
    receiving, by a content server from a device, an acoustic request for content, the acoustic request associated with an identifier associated with a first anonymous user;
    retrieving, by an override service of the content server from a content metadata database, a first profile associated with the acoustically requested content including a first value and a first score for each of a plurality of traits;
    retrieving, by the override service from a profile database, a second profile, the second profile associated with the identifier and including a second value and a second score for each of the plurality of traits;
    adjusting each of the first scores to generate adjusted first scores, based on an overlap between the corresponding traits of the first profile and second profile;

calculating, by a correlator of the override service, a comparison score between the first profile and second profile as an average of each of the adjusted first scores and second scores;

identifying, by the override service, the acoustic request as associated with a second anonymous user different from the first anonymous user, based on the comparison score;

identifying a first trait shared by the first profile and the second profile and a second trait not shared by first profile and the second profile; and disabling content personalization for the device for the second trait and enabling content personalization for the device for the first trait, responsive to identifying the acoustic request as associated with the second anonymous user.

11. The method of claim 10, wherein the first score and the second score are percentages.

12. The method of claim 10, comprising:
determining, for each of the plurality of traits, an average of each of the first score and second score.

13. The system of claim 10, wherein adjusting each of the first scores of the first profile comprises increasing a first score of the first profile for a first trait by a predetermined amount, responsive to the first profile and second profile both including the first trait.

14. The system of claim 10, wherein adjusting each of the first scores of the first profile comprises decreasing a first score of the first profile for a first trait by a predetermined amount, responsive to the second profile not including the first trait.

15. The method of claim 10, comprising:
selecting, by a content selector of the content provider, audio content for transmission to the device; and
transmitting, by the content provider, the audio content to the device.

16. The method of claim 15, comprising:
selecting the audio content from a subset of audio content having no selection criteria.

17. The method of claim 10, comprising:
generating, by the override service, an entry in an override session table comprising an identification of the device.

18. The method of claim 10, comprising:
adjusting each of the first scores of the first profile for the plurality of traits according to a predetermined weighting function based on an overlap between the corresponding traits of the first profile and second profile.

* * * * *